(12) United States Patent
Wang et al.

(10) Patent No.: US 8,966,147 B2
(45) Date of Patent: Feb. 24, 2015

(54) LOCK LEASING METHOD FOR SOLVING DEADLOCK

(76) Inventors: Wenguang Wang, Santa Clara, CA (US); Richard Paul Spillane, Mountain View, CA (US)

(*) Notice: Subject to any disclaimer, the term of this patent is extended or adjusted under 35 U.S.C. 154(b) by 240 days.

(21) Appl. No.: 13/592,282

(22) Filed: Aug. 22, 2012

(65) Prior Publication Data
US 2014/0059261 A1 Feb. 27, 2014

(51) Int. Cl.
*G06F 9/52* (2006.01)

(52) U.S. Cl.
USPC ............................................ 710/200; 718/107

(58) Field of Classification Search
USPC ........... 710/200; 718/100, 102, 104, 107, 108
See application file for complete search history.

(56) References Cited

U.S. PATENT DOCUMENTS

| | | | |
|---|---|---|---|
| 6,598,068 B1 | 7/2003 | Clark | |
| 6,862,666 B2 * | 3/2005 | Chong et al. | 711/152 |
| 7,124,131 B2 * | 10/2006 | Guthridge et al. | 1/1 |
| 8,370,318 B2 | 2/2013 | Chan et al. | |
| 8,543,781 B2 * | 9/2013 | Rawat et al. | 711/156 |
| 2006/0136508 A1 | 6/2006 | Idicula et al. | |
| 2007/0094431 A1 * | 4/2007 | Fachan | 710/200 |

* cited by examiner

*Primary Examiner* — Glenn A Auve
(74) *Attorney, Agent, or Firm* — Womble Carlyle Sandridge & Rice, LLP (57) ABSTRACT

A method for resolving deadlock in a multi-threaded computing system using a novel lock lease is disclosed. A first thread leases a lock held by the first thread to a second thread different from the first thread. The leasing transfers control of the lock to the second thread while the first thread retains ownership of the lock. To lease the lock: (1) the second thread applies for the lease from the first thread; (2) the first thread grants the lease; (3) the first thread waits for the second thread to complete a task; (4) the second thread terminates the lease; (5) the first thread confirms termination of the lease. The first thread receives control of the lock back from the second thread after the second thread has finished using resources controlled by the lock. The second thread also can sublease the lock to a third thread.

22 Claims, 10 Drawing Sheets

2 common I/O tasks using single threading

Task 1 - I/O request

Task 2 - I/O completion

I/O leasable Workloop init()
free()

void leaseApply()
void leaseGrant()
void leaseTerminate()
void leaseConfirmTermination()
[WL routines]

LOCK LEASING METHOD FOR SOLVING DEADLOCK

FIELD OF THE DESCRIBED EMBODIMENTS

The described embodiments relate generally to methods and apparatuses for solving deadlock, and more particularly to methods and apparatuses using a novel lock lease for solving deadlock.

BACKGROUND

In computer systems, a lock is a synchronization mechanism used to enforce limits on access to a resource in an environment where there are many executing threads. In other words, locks are used to enforce concurrency control policies. Locks are vulnerable to certain problems and failures. One such problem is deadlock, where each of two threads waits for a lock that the other thread holds and will not proceed until it has acquired the lock. Consequently, unless something is done, both threads will wait forever for each other.

In a conventional single threaded computing system, a single thread can lock and unlock the same lock in the same thread so that no deadlock problem will occur. On the other hand, in a more sophisticated multi-threaded computing system, deadlocks can occur when more than one thread need to acquire the same lock. For example, one common source of deadlock is the following scenario. Two threads $t\_1$ and $t\_2$ share a set of common resources R by taking a lock L before accessing any of the resources in R and releasing it when done with that resource. Consider the case where thread $t\_1$ takes lock L to access resource $r\_1$ in R, and then waits on thread $t\_2$ to perform a task. Deadlock occurs if thread $t\_2$ must take lock L to access resource $r\_2$ in R before it can finish. In that situation, thread $t\_1$ waits for thread $t\_2$ to finish, while thread $t\_2$ waits for thread $t\_1$ to release lock L. They will both wait forever and not make any further progress, resulting in a deadlock.

The standard solution to this problem is create two locks $L\_1$ and $L\_2$ and split the set of resources R into two groups $R\_1$ and $R\_2$ controlled by these two different locks, making sure $r\_1$ is a member of $R\_1$ and $r\_2$ is a member of $R\_2$. Now thread $t\_1$ takes lock $L\_1$ to access $r\_1$ and waits on thread $t\_2$. Thread $t\_2$ takes lock $L\_2$ to access $r\_2$. Thread $t\_2$ successfully completes its transaction, so now thread $t\_1$ can also proceed. This resolves the deadlock. However, for a large, existing piece of software, correctly dividing resources originally synchronized by a single lock into two groups synchronized by separate locks requires a significant and often overly costly engineering effort.

In summary, deadlock can easily occur when two threads accessing separate resources must cooperate but these separate resources are accessed under the same lock. Re-engineering the software so that these separate resources are accessed under separate locks may be too costly if the software is very complex. Therefore, what is desired is an invention to avoid deadlock and costly re-engineering of software.

SUMMARY OF THE DESCRIBED EMBODIMENTS

This paper describes various embodiments that relate to methods and apparatuses that use a novel lock lease for solving deadlock. A lock lease allows a first thread to transfer control of a lock it owns to a second thread. The leasing transfers control of the lock to the second thread while the first thread retains ownership of the lock. In this way, the second thread can use the resources controlled by the lock, while ownership of the lock with the first thread protects the lock from other threads. The second thread returns control of the lock back to the first thread after the second thread has finished using resources controlled by the lock. In one embodiment, the second thread can belong to a group of select threads given authorization to lease the lock. If two or more threads from the group of select threads attempt to lease the lock at the same time, the second thread is chosen based on one of the following queues: a priority based scheduling queue, a round robin queue, first in first out queue, and shortest remaining time queue. In another embodiment, the second thread can further transfer control of the lock to a third thread through subleasing. The third thread returns the lease to the second or first thread, after the third thread has finished using resources controlled by the lock.

A method for resolving deadlock in a multi-threaded computing system is disclosed. In one embodiment, the method includes a first thread leasing a lock held by the first thread to a second thread different from the first thread. The leasing transfers control of the lock to the second thread while the first thread retains ownership of the lock. The first thread receives control of the lock back from the second thread after the second thread has finished using the lock. In another embodiment, the first thread leases the lock held by the first thread to the second thread different from the first thread through the following steps: (1) the second thread applies for the lease on the lock; (2) the first thread grants the lease on the lock; (3) the first thread waits for the second thread to complete a task; (4) the second thread terminates the lease on the lock; and (5) the first thread confirms termination of the lease on the lock. In yet another embodiment, the second thread belongs to a group of select threads given authorization to lease the lock. If two or more threads from the group of select threads attempt to lease the lock at the same time, the second thread is chosen based on one of the following queues: a priority based scheduling queue, a round robin queue, first in first out queue, and shortest remaining time queue. In a further embodiment, the second thread can also sublease the lock to a third thread different from the first and second threads. The subleasing transfers control of the lock to the third thread while the first thread retains ownership of the lock. The second thread receives control of the lock back from the third thread after the third thread has finished using the lock.

An electronic device for resolving deadlock in a multi-threaded computing system is disclosed. The electronic device includes a processor configured to lease by a first thread a lock held by the first thread to a second thread different from the first thread. The lease enables the second thread to use resources controlled by the lock while the first thread continues to own the lock. The processor is further configured to return the use of resources controlled by the lock back to the first thread after the second thread has finished using resources controlled by the lock. In another embodiment, when leasing by the first thread the lock held by the first thread to the second thread different from the first thread, the processor is configured to: (1) apply for the lease on the lock by the second thread; (2) grant the lease on the lock by the first thread; (3) wait for the second thread to complete a task by the first thread; (4) terminate the lease on the lock by the second thread; and (5) confirm termination of the lease on the lock by the first thread.

A computer program product encoded in a non-transitory computer readable medium for resolving deadlock in a multi-threaded computing system is disclosed. In one embodiment, the computer program product includes computer code for leasing by a first thread a lock held by the first thread to a second thread different from the first thread. The leasing transfers control of the lock to the second thread, while the first thread retains ownership of the lock and does not use resources controlled by the lock during leasing. The computer program product further includes computer code for receiving by the first thread control of the lock back from the second thread after the second thread has finished using resources controlled by the lock. In another embodiment, the computer program code for leasing the lock held by the first thread to the second thread includes the following: (1) computer code for applying for the lease on the lock by the second thread; (2) computer code for granting the lease on the lock by the first thread; (3) computer code for waiting for the second thread to complete a task by the first thread; (4) computer code for terminating the lease on the lock by the second thread; and (5) computer code for confirming termination of the lease on the lock by the first thread.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In particular, the following detailed description often refer to a single lock as the WL (workloop) lock in the context of I/O driver stack, but it is understood that this is merely an example to enable one skilled in the art to practice the described embodiments. It is further understood that this example is not limited to WL (workloop) lock in the context of I/O driver stack; such that other embodiments may be used, and changes may be made without departing from the spirit and scope of the described embodiments.

Deadlock issue occurring when multi-threading is used in the context of I/O (input/output) driver stack is provided as an example. I/O or input/output is the communication between an information processing system (such as a computer) and the outside world, possibly a human or another information processing system. With an incoming I/O, its I/O request is passed down through the layers. When the lowest hardware layer has satisfied the request, the request is sent back up the layers. If each driver has its own lock, instead of having a single WL (workloop) lock for the entire driver stack, then it is very easy to form deadlocks, because the incoming I/O request takes the locks in a reverse order from the outgoing notification. The incoming I/O will take the higher level lock first, then the lower level lock. The order is going from top to bottom. But when the I/O finishes, the notification is sent back up and the order is reversed, going from bottom to top. This reversal in order makes it easy to form deadlocks. Having a single lock such as the WL (workloop) lock for the entire driver stack solves this potential deadlock problem. With a single lock, no matter where the request comes from (whether it is an incoming I/O request or the device is unplugged and a notification comes in from the bottom), they all take the same lock. It does not matter if the single lock is taken from the top or bottom layer. It is the same lock, so the driver holding the lock has access to all the resources associated with the single lock. Consequently, when the driver stack is locked by a single thread, no other threads can use that lock. All other threads have to wait until that single thread releases the single lock. This ensures consistency of the I/O driver data.

Figure 1:
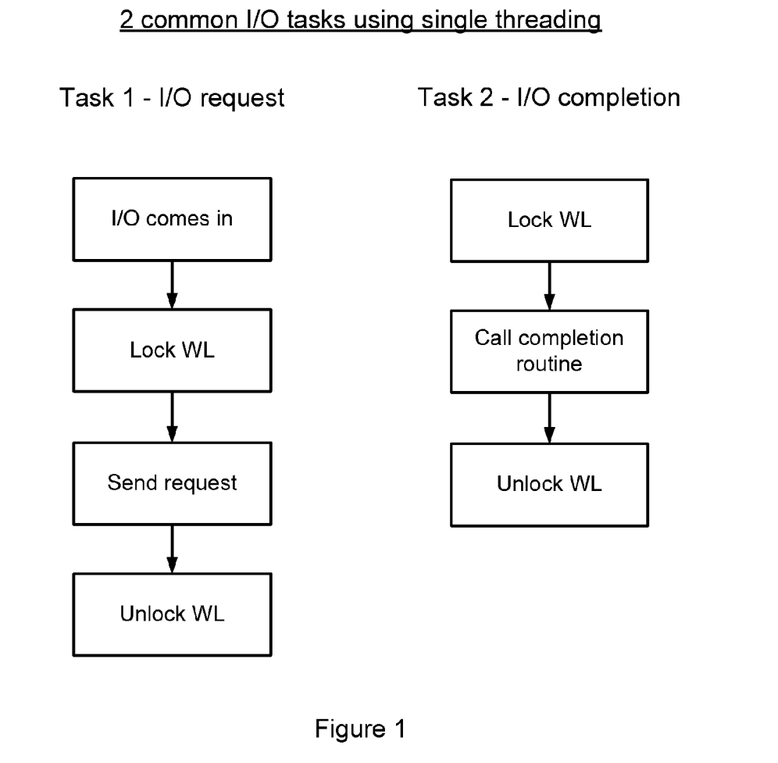
FIG. 1 illustrates two common I/O tasks using single threading.

In single threading, there are no deadlock problems, because the locking and unlocking of the WL (workloop) lock can be designed to occur within a single thread. In FIG. 1, two common I/O tasks using single threading is shown. In task 1, an I/O request is executed as follows: (1) an I/O comes in; (2) it locks the WL (workloop) lock; (3) it sends request; and (4) it unlocks the WL lock. In task 2, an I/O completion is executed as follows: (1) it locks the WL lock; (2) it calls Completion routine; and (3) it unlocks the WL lock. All the WL locking and unlocking occur within a single thread so there are no deadlock issues. In general, deadlock issues can be avoided by not holding the lock across different I/O requests.

Figure 2:
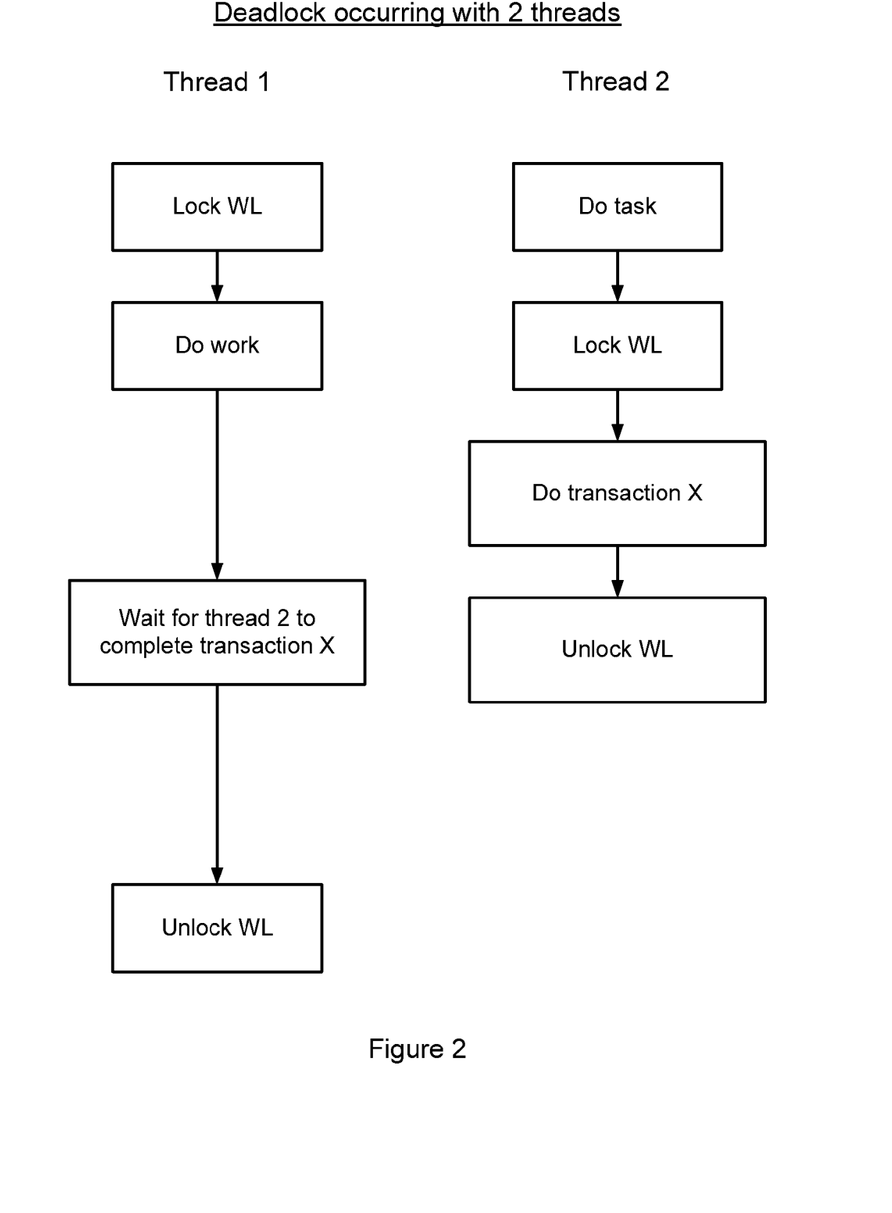
FIG. 2 illustrates deadlock problem occurring in a multi-threading computing system.

However, as the I/O drivers become more and more sophisticated, there is a desire for the drivers to become multi-threaded, so they can do some background maintenance tasks, etc. The complex I/O driver software uses one WL lock to synchronize access to many separate resources. With multi-threading, two threads can access separate resources that are locked under the same WL lock. When these two threads wait on each other, they deadlock. FIG. 2 shows an example of how deadlocks can occur in multi-threading. Thread 1 locks WL. Then it waits for thread 2 to complete transaction X, before it can unlock WL. However, thread 2 needs to lock WL in order to complete transaction X, so there is a deadlock as threads 1 and 2 wait for each other. Please note that this deadlock does not occur in single threading, because in single threading one thread does all this processing and so the WL lock is always available to this one thread.

The deadlock shown in FIG. 2 can be avoided through the use of a mechanism called lock leasing. In lock leasing, a first thread "leases" a lock it owns to a second thread by transferring control completely to the second thread during the leasing period. During the leasing period, the first thread ("lessor") just waits for the second thread ("lessee") to complete its processing and it does nothing with respect to the lock or the resources the lock grants access to. This is an important element of this mechanism, because, by not doing any processing with respect to the lock or the resources the lock grants access to, consistency of the data is guaranteed. If, on the other hand, the first thread does something concurrently with the second thread while the second thread is holding the lease, then data consistency may be compromised. Another key to this mechanism is that the first thread retains ownership of the lock, so this prevents other threads from accessing resources associated with the lock while the second thread is leasing the lock. Of course, it is also important for the first thread to make sure the internal structure that is protected by the lock is consistent before the first thread hands over the leased lock to the second thread. If there is any inconsistency with the internal structure, then it would be unsafe for the second thread to take the leased lock. Similarly, this data consistency should also be maintained before the second thread returns the leased lock back to the first thread at the end of the lease. In other words, lock leasing can avoid deadlocks, if a lessor thread allows a lessee thread to run via a lease when the lessor thread knows the lessee thread will access orthogonal resources and so there is no risk of violating consistency.

Figure 3:
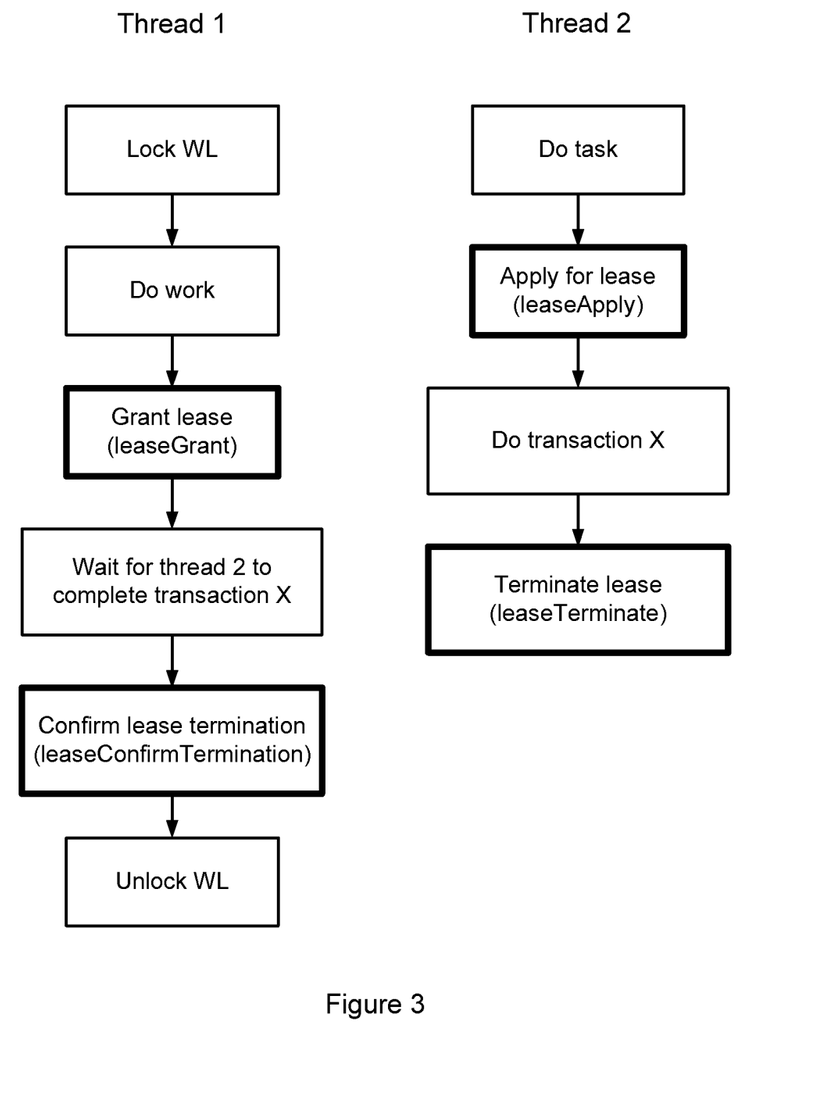
FIG. 3 illustrates the use of lock leasing to resolve deadlock problem occurring in a multi-threading computing system.

FIG. 3 illustrates how an embodiment of this lock leasing can be implemented to the multi-threaded process shown in FIG. 2. Since one of the key goals is to avoid rewrite or redesign of the software, lock leasing can be accomplished by making the following changes. The first thread adds the additional steps of (1) grant lock lease and (2) confirm termination of lease. These two steps are represented in FIG. 3 by the routines leaseGrant and leaseConfirmTermination, respectively. The second thread changes the steps of lock WL and unlock WL to become the steps of (1) apply for lock lease and (2) terminate lock lease. These two steps are represented in FIG. 3 by the routines leaseApply and leaseTerminate, respectively.

Figure 4:
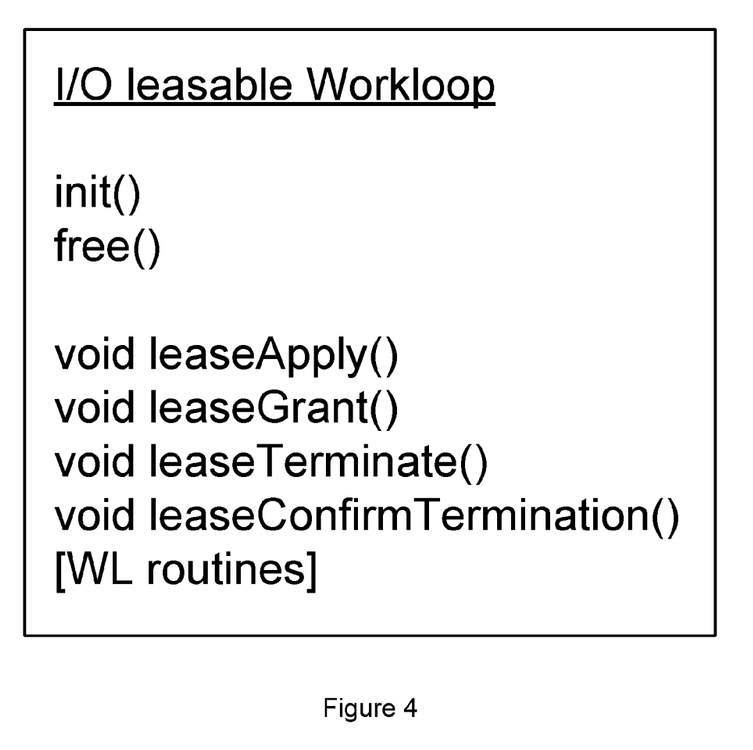
FIG. 4 illustrates a sample code for implementing lock leasing.

FIG. 4 shows a sample code for implementing lock leasing shown in FIG. 3. In the API (application programming interface), a new type of workloop (WL) is created from the old workloop (WL) by extending the old workloop (WL) with additional routines. In FIG. 4, WL routines normally associated with the old workloop (WL) are shown as [WL routines]. Four new routines are added. The new routines are: (1) leaseApply, (2) leaseGrant, (3) leaseTerminate, and (4) leaseConfirmTermination. The WL lock is also called the gate lock. Going back to FIG. 3, thread 1 owns the WL lock, while thread 2 is trying to acquire a lease on the WL lock. Thread 2 attempts to acquire the lease by calling leaseApply. Thread 1 will grant the lease, once thread 1 is ready to wait on thread 2, which is applying for the lease. Thread 1 grants the lease to WL by calling the routine leaseGrant. When thread 1 grants the lease, leaseApply may return true. When thread 2 is done with transaction X, thread 2 will call leaseTerminate. Similarly, thread 1 will call leaseConfirmTermination when thread 1 can confirm that it has complete control of the lease again and that no other thread has taken the lease or done any work.

Figure 5:
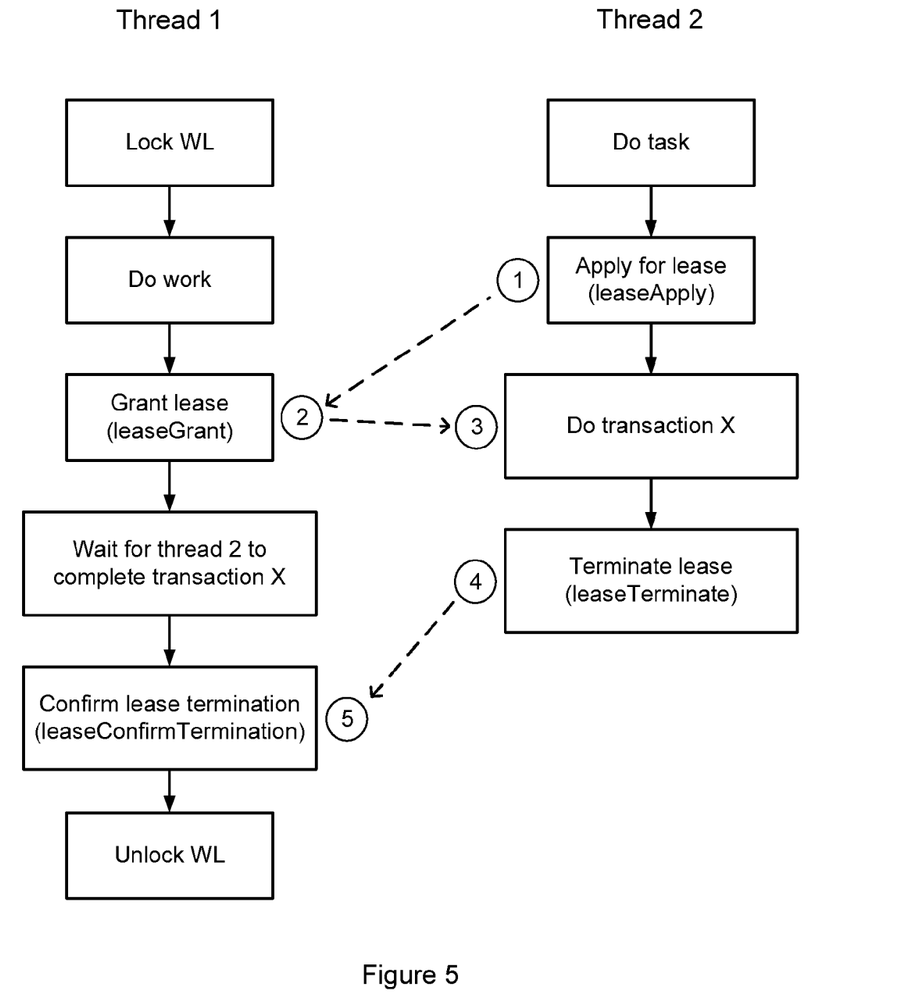
FIG. 5 illustrates sequential steps for using lock leasing to resolve deadlock problem occurring in a multi-threading computing system.

In FIG. 5, the interaction between thread 1 and thread 2 is shown more clearly, by highlighting the sequence of events. The process begins with thread 1 locking WL. Thread 1 does some work. Then it needs to wait for thread 2 to complete transaction X. This triggers thread 2 to do task. Since thread 2 requires WL lock to do transaction X, thread 2 calls leaseApply to apply for a lock lease on WL. Thread 1 grants the lock lease on WL when it is ready to wait for thread 2 by calling leaseGrant. Once thread 2 has the lock lease on WL, it is able to complete transaction X. Because thread 1 still owns the WL lock, it is able to block out other threads also trying to acquire the WL lock. This protects the data that thread 2 needs to access for completion of transaction X. When thread 2 has completed transaction X, it is able to terminate the lock lease on WL by calling leaseTerminate. Similarly, when thread 1 can confirm that it has complete control of the lease again and that no other thread has taken the lease or done any work, thread 1 can confirm lease termination by calling leaseConfirmTermination. Alternatively, the step of confirming termination of the lease on the lock by the first thread can be performed before the step of terminating the lease on the lock by the second thread. For this to occur, thread 1 should first confirm that transaction X has already been completed, before calling routine leaseConfirmTermination. Later, thread 1 should confirm that thread 2 has already called routine leaseTerminate, before thread 1 unlocks WL.

Figure 6:
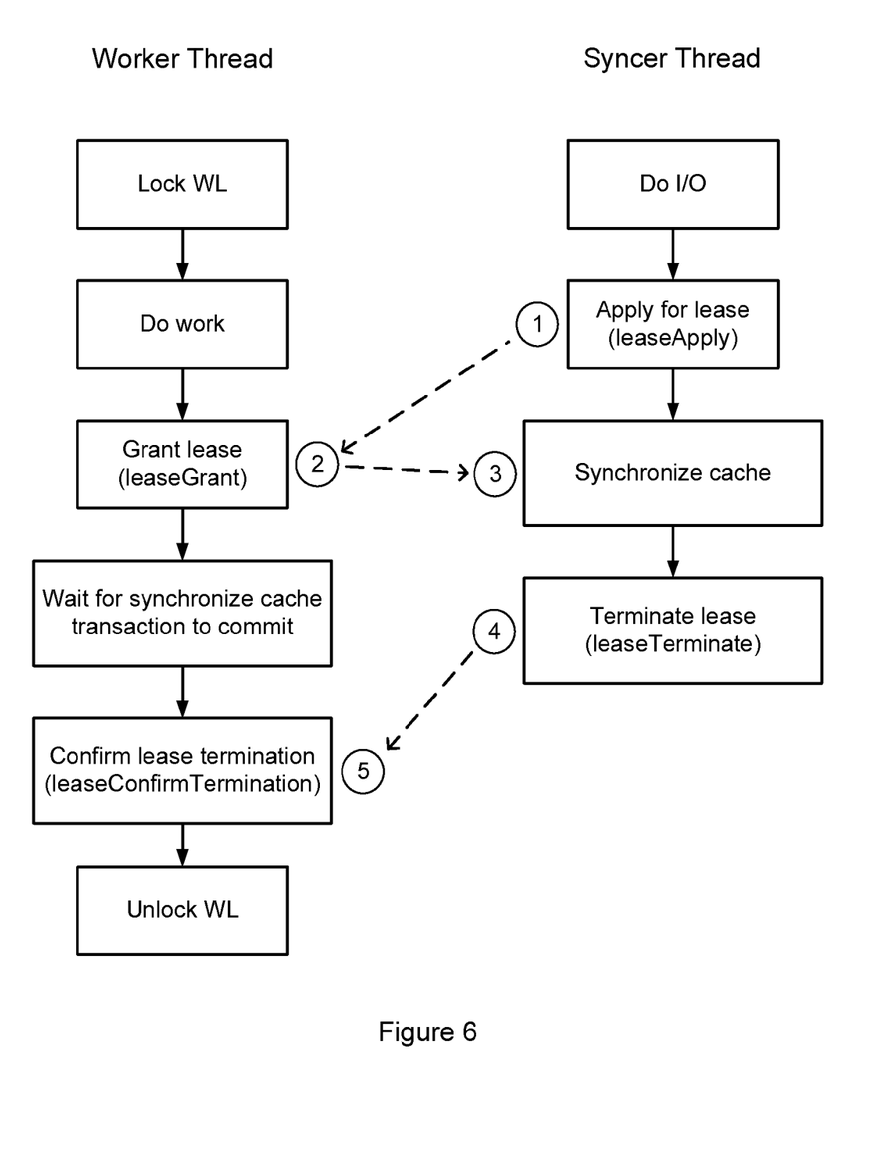
FIG. 6 illustrates sequential steps for using lock leasing to resolve deadlock problem occurring in a multi-threading computing system when synchronizing cache.

To further illustrate the principles of lock leasing as demonstrated in FIG. 5, an embodiment from I/O drivers is shown in FIG. 6. Here, lock leasing is applied to the task of clearing hardware cache so that deadlocks occurring in a multi-threaded computing system are prevented. The issue of deadlock arises because two concurrently processing threads are involved with the task of clearing hardware cache. In the beginning, a worker thread is activated on a client's request. This is equivalent to thread 1 from FIGS. 3 and 5. Worker thread locks WL and it does work. Worker thread needs to wait for the clearing cache task to complete. However, the clearing cache task is performed by a different thread, namely the syncer thread. The syncer thread is equivalent to thread 2 from FIGS. 3 and 5. The syncer thread will do I/O and issue request to synchronize cache, which is a special request to clear the cache of the hardware. To do a synchronize cache, the syncer thread needs the WL lock. Since the worker thread still has WL lock, syncer thread will do nothing while it waits for the WL lock. Meanwhile, worker thread is holding WL lock and also waiting for the syncer thread to do a synchronize cache. Because both the worker thread and syncer thread are waiting for each other, there is a deadlock. It should be noted that the WL lock was originally designed for the situation where all these operations are processed in the same thread (i.e., single threading), so the WL lock will be available for all the operations to use. But the more sophisticated multi-threaded driver has bifurcated these operations into two threads, so both threads wait for each other, resulting in deadlock.

The lock leasing methodology of FIG. 5 can be applied to solve the deadlock problem for synchronizing cache. This is shown in FIG. 6. First a new kind of WL lock is created, using the routines shown in FIG. 4. The process begins with worker thread locking WL. Worker thread does some work. Then it needs to wait for the synchronize cache transaction to commit. Synchronize cache is performed by the syncer thread. The syncer thread does I/O. Then the syncer thread calls leaseApply to apply for a lock lease on WL. Worker thread grants the lock lease on WL, when it is ready to wait for syncer thread, by calling leaseGrant. Once the syncer thread has the lock lease on WL, it is able to complete the synchronize cache transaction, which is a special request to clear the cache of the hardware. The worker thread protects the data that syncer thread will access from other threads, because the worker thread still owns the WL lock. At the same time, the worker thread is just waiting and not doing anything, or at least not doing anything related to the lock and the data the lock protects. All this helps to protect the syncer thread transactions and maintain data consistency. When syncer thread has completed synchronizing the cache, it is able to terminate the lock lease on WL by calling leaseTerminate. Similarly, when the worker thread can confirm that it has complete control of the WL lock again and that no other thread has taken the lease or done any work, worker thread can confirm lease termination by calling leaseConfirmTermination.

FIG. 6 presents an example of lock leasing as applied to I/O drivers. A device driver or software driver is defined to be a computer program which allows higher-level computer programs to interact with a hardware device. However, application of the lock leasing method is not limited to I/O drivers. In fact, the lock leasing method can be used in any concurrent situation, where you have a deadlock problem. It is particularly useful, if you have a large lock and it is impossible to reorder your locking structure, or you have a very complex software stack. A lock leasing technique like this allows one to safely continue without violating locking semantics and without introducing inversion deadlocks.

Figure 7:
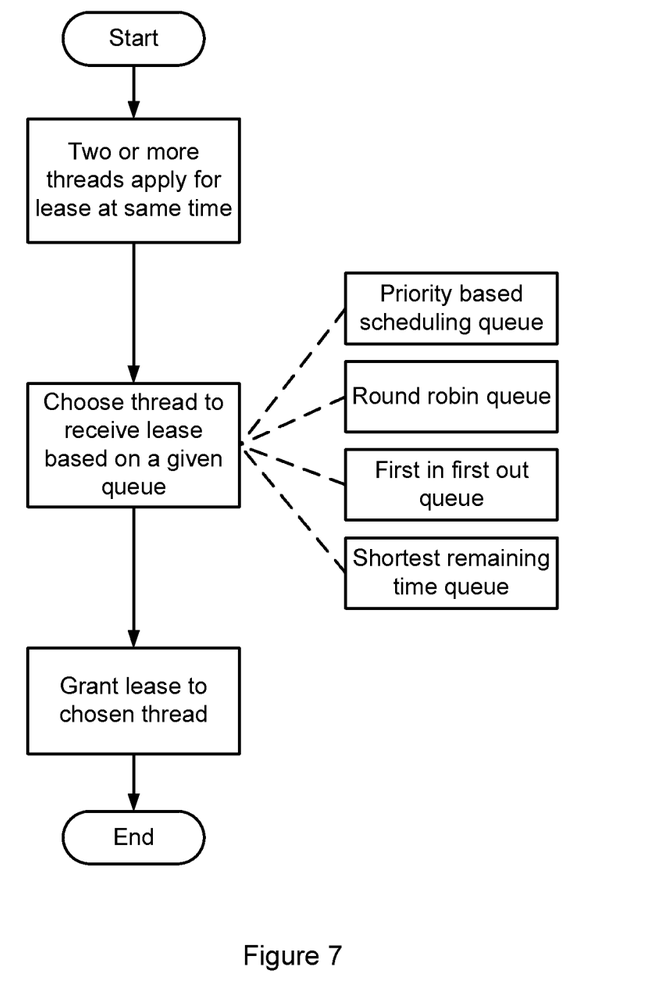
FIG. 7 illustrates a method to choose a thread for lock leasing when two or more threads compete for the same lock lease.

In one embodiment, such as the worker thread and syncer thread example shown in FIG. 6, only one thread is given authorization to lease the WL lock. This is accomplished by providing the identification of the syncer thread to the worker thread. However, in other embodiments, the authorization to lease the WL lock can be extended to more than one thread. In fact, there may be a plurality of select threads which are given authorization to lease the WL lock. This plurality of threads can in turn be contained in a list of authorized lock lessees. In the scenario where there are more than one authorized lock lessee, a situation can occur where two or more threads from the plurality of select threads attempt to lease the lock at the same time. In that case, the second thread can be chosen based on one of the following queues: a priority based scheduling queue, a round robin queue, first in first out queue, and shortest remaining time queue. An example of such a method to choose a thread for lock leasing when two or more threads compete for the same lock lease is shown in FIG. 7.

Figure 8A:
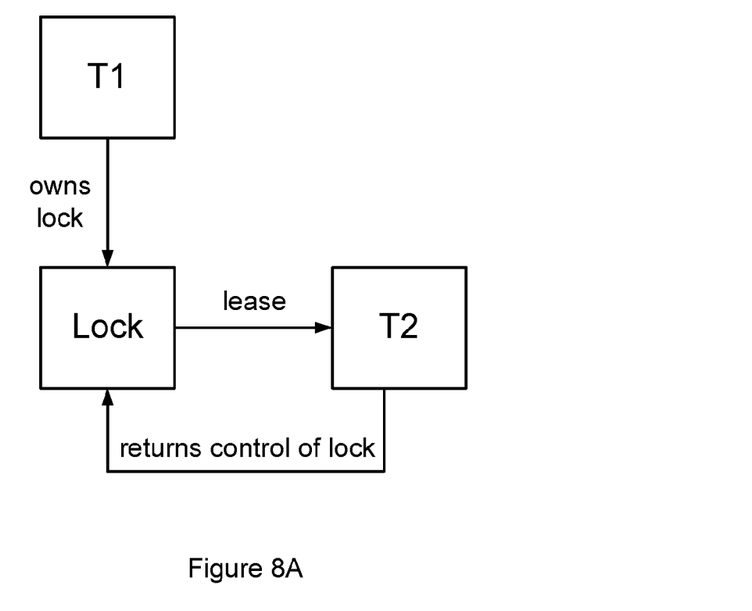
FIGS. 8A-8C illustrate lock leasing and subleasing.
Figure 8B:
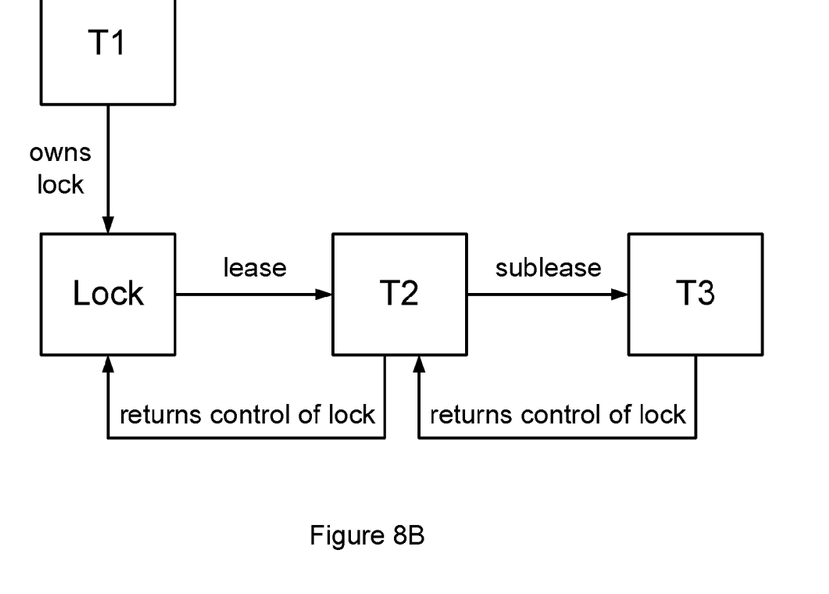
Figure 8C:
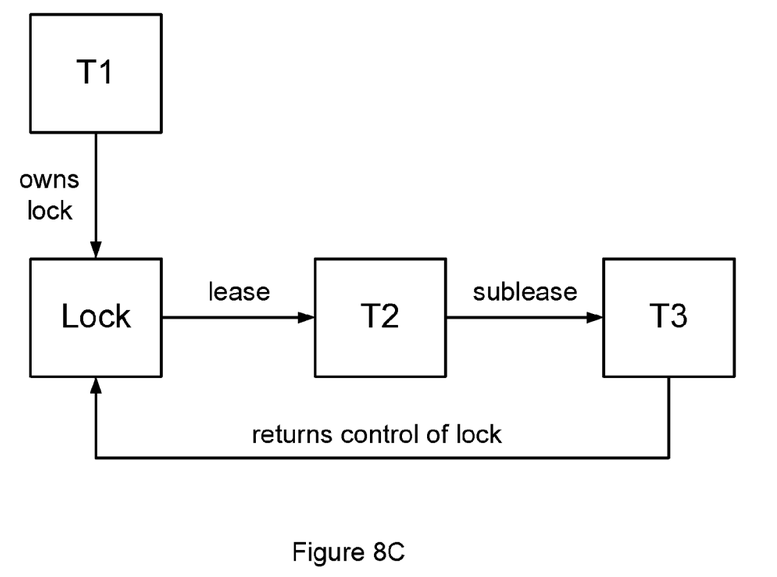

FIGS. 8A-8C illustrate the possibilities to lease and sublease a lock. FIG. 8A shows thread T1 owning a lock and then leasing the lock to thread T2. Note that thread T1 retains ownership of the lock during the leasing period, but transfers control of the lock to the second thread. Thread T2 returns control of the lock back to thread T1 after thread T2 has finished using the lock.

FIG. 8B shows thread T1 owning a lock and then leasing the lock to thread T2. Thread T1 retains ownership of the lock during the leasing period. Then thread T2 further subleases the lock to thread T3. Thread T1 retains ownership of the lock during the subleasing period, but the sublease transfers control of the lock from thread T2 to thread T3. Thread T3 returns control of the lock to thread T2 after thread T3 has finished using the lock. Thread T2 returns control of the lock to thread T1 after thread T2 has finished using the lock. The key to keeping the data consistent throughout the lease and sublease is for thread T1 to retain ownership, so it will keep other threads from accessing the lock or the data protected by the lock. Furthermore, thread T1 will wait for thread T2 and T3 during the lease and sublease, and do nothing, or at least do nothing with respect to the data protected by the lock. Thread T1 will also make sure it hands over a consistent data structure over to thread T2. Similarly, thread T2 will wait for thread T3 during the sublease, and do nothing, or at least do nothing with respect to the data protected by the lock. Thread T2 will also make sure it hands over a consistent data structure to thread T3. Obviously, additional routines similar to those shown in FIG. 4 will have to be developed for the sublease scenario. It is not shown here, but following the above principles it is also possible to have further nested levels of subleasing.

FIG. 8B shows thread T3 returning control of the lock first to thread T2 and then thread T2 further returning control of the lock to thread T1. However, it can also be possible for thread T3 to return control of the lock to thread T1 after thread T3 has finished using the lock, if thread T2 had previously finished using the lock. This is shown in FIG. 8C. In order for this to happen, thread T2 should know beforehand that control of the lock will not be returning to thread T2 so it will not be waiting to confirm termination of sublease. Thread T2 should also notify thread T1 that the lock has been subleased to thread T3 and that thread T3 will be returning control of the lock directly to thread T1, so thread T1 will not be waiting for return of the control of the lock from thread T2. Thread T3 should also be aware that it is to return control of the lock to thread T1 and not to thread T2. Obviously, additional routines will have to be developed to handle these special scenarios.

Figure 9:
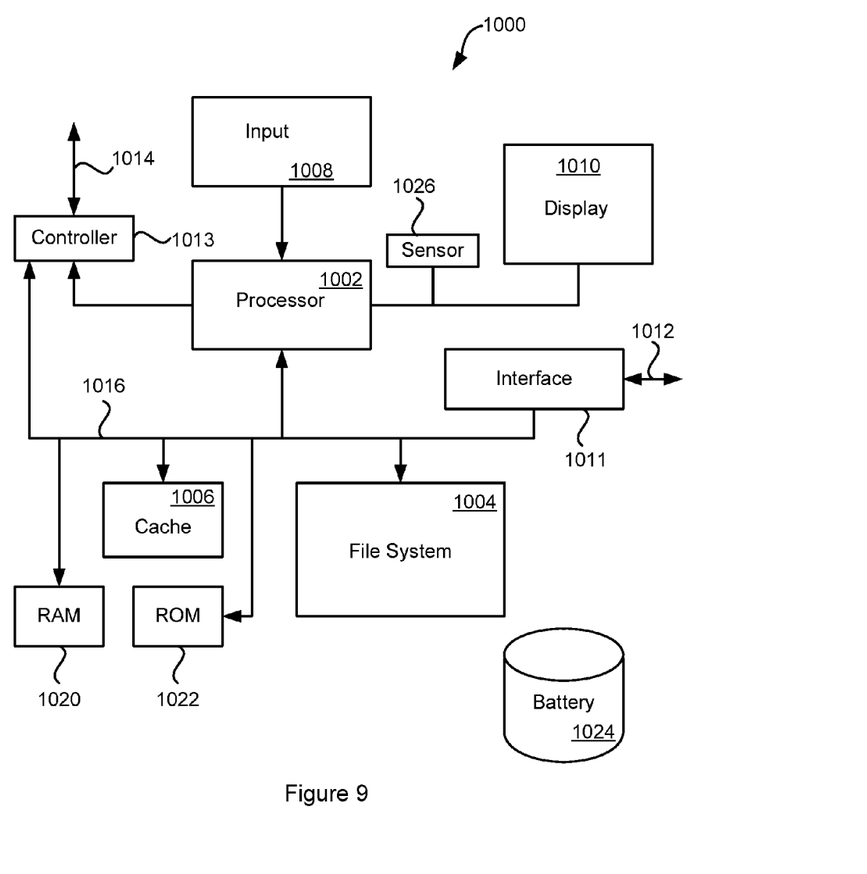
FIG. 9 illustrates a block diagram of an electronic device suitable for implementing some of the described embodiments.

FIG. 9 is a block diagram of an electronic device suitable for controlling some of the processes in the described embodiment. Electronic device 1000 can illustrate circuitry of a representative computing device. Electronic device 1000 can include a processor 1002 that pertains to a microprocessor or controller for controlling the overall operation of electronic device 1000. Electronic device 1000 can include data in a file system 1004 and a cache 1006. File system 1004 can be a storage disk or a plurality of disks. In some embodiments, file system 1004 can be flash memory, semiconductor (solid state) memory or the like. The file system 1004 can typically provide high capacity storage capability for the electronic device 1000. However, since the access time to the file system 1004 can be relatively slow (especially if file system 1004 includes a mechanical disk drive), the electronic device 1000 can also include cache 1006. The cache 1006 can include, for example, Random-Access Memory (RAM) provided by semiconductor memory. The relative access time to the cache 1006 can be substantially shorter than for the file system 1004. However, cache 1006 may not have the large storage capacity of file system 1004. Further, file system 1004, when active, can consume more power than cache 1006. Power consumption often can be a concern when the electronic device 1000 is a portable device that is powered by battery 1024. The electronic device 1000 can also include a RAM 1020 and a Read-Only Memory (ROM) 1022. The ROM 1022 can store programs, utilities or processes to be executed in a non-volatile manner. The RAM 1020 can provide volatile data storage, such as for cache 1006.

Electronic device 1000 can also include user input device 1008 that allows a user of the electronic device 1000 to interact with the electronic device 1000. For example, user input device 1008 can take a variety of forms, such as a button, keypad, dial, touch screen, audio input interface, visual/image capture input interface, input in the form of sensor data, etc. Still further, electronic device 1000 can include a display 1010 (screen display) that can be controlled by processor 1002 to display information to the user. Data bus 1016 can facilitate data transfer between at least file system 1004, cache 1006, processor 1002, and controller 1013. Controller 1013 can be used to interface with and control different hardware equipment through equipment control bus 1014. For example, control bus 1014 can be used to control a printer, an image scanner, a digital camera or other such equipment.

Electronic device 1000 can also include a network/bus interface 1011 that couples to data link 1012. Data link 1012 can allow electronic device 1000 to couple to a host computer or to accessory devices. The data link 1012 can be provided over a wired connection or a wireless connection. In the case of a wireless connection, network/bus interface 1011 can include a wireless transceiver. Sensor 1026 can take the form of circuitry for detecting any number of stimuli. For example, sensor 1026 can include any number of sensors such as for example an audio sensor, a light sensor, computer vision sensor and so on.

The various aspects, embodiments, implementations or features of the described embodiments can be used separately or in any combination. Various aspects of the described embodiments can be implemented by software, hardware or a combination of hardware and software. The described embodiments can also be embodied as a computer program product comprising computer readable code encoded in a non-transitory computer readable medium. The computer readable medium is any data storage device that can store data which can thereafter be read by a computer system. Examples of the computer readable medium include read-only memory, random-access memory, CD-ROMs, HDDs, SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for resolving deadlock in a multi-threaded computing system, the method comprising:
   leasing, by a first thread, a lock held by the first thread to a second thread different from the first thread, wherein leasing the lock comprises transferring control of the lock to the second thread while the first thread retains ownership of the lock; and
   receiving, by the first thread, the control of the lock back from the second thread after the second thread has finished using the lock.

2. The method of claim 1, further comprising:
   applying for a lease on the lock by the second thread;
   granting the lease on the lock by the first thread;
   waiting for the second thread to complete a task by the first thread;
   terminating the lease on the lock by the second thread; and
   confirming termination of the lease on the lock by the first thread.

3. The method of claim 2, wherein the second thread belongs to a plurality of select threads given authorization to lease the lock.

4. The method of claim 3, wherein:
   when two or more threads from the plurality of select threads attempt to lease the lock at the same time, the second thread is chosen based on one of the following queues: a priority based scheduling queue, a round robin queue, a first in first out queue, and a shortest remaining time queue.

5. The method of claim 2, wherein only one thread is given authorization to lease the lock.

6. The method of claim 2, wherein confirming termination of the lease on the lock by the first thread is performed before terminating the lease on the lock by the second thread.

7. The method of claim 1, wherein the first thread and the second thread are used to interact with a hardware device.

8. The method of claim 7, wherein the second thread is used to synchronize cache.

9. The method of claim 1, wherein the method further comprises:
   subleasing by the second thread, during a lease on the lock, the lock leased by the second thread to a third thread different from the first and second threads, wherein subleasing the lock transfers control of the lock to the third thread while the first thread retains ownership of the lock; and
   receiving, by the second thread, the control of the lock back from the third thread after the third thread has finished using the lock.

10. The method of claim 1, wherein the method further comprises:
    subleasing by the second thread, during a lease on the lock, the lock leased by the second thread to a third thread different from the first and second threads, wherein subleasing the lock transfers control of the lock to the third thread while the first thread retains ownership of the lock; and
    receiving, by the first thread, the control of the lock directly back from the third thread after the third thread has finished using the lock without having the control of the lock pass through the second thread.

11. An electronic device for resolving deadlock in a multi-threaded computing system, the electronic device comprising:
    a processor configured to:
    lease, by a first thread, a lock held by the first thread to a second thread different from the first thread, wherein the lease enables the second thread to use one or more resources controlled by the lock while the first thread continues to own the lock; and
    return the use of the one or more resources controlled by the lock back to the first thread after the second thread has finished using the one or more resources controlled by the lock.

12. The electronic device of claim 11, wherein the processor is further configured to:
    apply for the lease on the lock by the second thread,
    grant the lease on the lock by the first thread,
    wait for the second thread to complete a task by the first thread,
    terminate the lease on the lock by the second thread, and
    confirm termination of the lease on the lock by the first thread.

13. The electronic device of claim 12, wherein the second thread belongs to a plurality of select threads given authorization to lease the lock.

14. The electronic device of claim 13, wherein:
when two or more threads from the plurality of select threads attempt to lease the lock at the same time, the second thread is chosen based on one of the following queues: a priority based scheduling queue, a round robin queue, a first in first out queue, and a shortest remaining time queue.

15. The electronic device of claim 11, wherein the first thread and the second thread are used to interact with a hardware device.

16. The electronic device of claim 15, wherein the second thread is used to synchronize cache.

17. A non-transitory computer readable medium storing instructions that, when executed by a processor included in a computing device, cause the computing device to resolve deadlock in a multi-threaded computing system, by carrying out the steps that include:
leasing, by a first thread, a lock held by the first thread to a second thread different from the first thread,
wherein leasing the lock comprises transferring control of the lock to the second thread, while the first thread retains ownership of the lock and does not use one or more resources controlled by the lock during leasing the lock; and
receiving, by the first thread, the control of the lock back from the second thread after the second thread has finished using the one or more resources controlled by the lock.

18. The non-transitory computer readable medium of claim 17, wherein the steps further include:
applying for a lease on the lock by the second thread;
granting the lease on the lock by the first thread;
waiting for the second thread to complete a task by the first thread;
terminating the lease on the lock by the second thread; and
confirming termination of the lease on the lock by the first thread.

19. The non-transitory computer readable medium of claim 18, wherein the second thread belongs to a plurality of select threads given authorization to lease the lock.

20. The non-transitory computer of claim 19, wherein:
when two or more threads from the plurality of select threads attempt to lease the lock at the same time, the second thread is chosen based on one of the following queues: a priority based scheduling queue, a round robin queue, a first in first out queue, and a shortest remaining time queue.

21. The non-transitory computer readable medium claim 17, wherein the first thread and the second thread are used to interact with a hardware device.

22. The non-transitory computer readable medium of claim 21, wherein the second thread is used to synchronize cache.

* * * * *